US012638138B2

(12) United States Patent
Frenal et al.

(10) Patent No.: US 12,638,138 B2
(45) Date of Patent: May 26, 2026

(54) DEVICE FOR PROTECTING A DEVICE FOR SUPPLYING PRESSURISED FLUID

(71) Applicants: L'AIR LIQUIDE, SOCIETE ANONYME POUR L'ETUDE ET L'EXPLOITATION DES PROCEDES GEORGES CLAUDE, Paris (FR); MICRO MATIC A/S, Odense SV (DK)

(72) Inventors: Antoine Frenal, Jouy en Josas (FR); Klaus Wiemer, Odense SV (DK); Morten Winther, Odense SV (DK); Kasper Banggaard Steffensen, Odense SV (DK)

(73) Assignees: L'AIR LIQUIDE, SOCIETE ANONYME POUR L'ETUDE ET L'EXPLOITATION DES PROCEDES GEORGES CLAUDE (FR); MICRO MATIC A/S (DK)

( * ) Notice: Subject to any disclaimer, the term of this patent is extended or adjusted under 35 U.S.C. 154(b) by 0 days.

(21) Appl. No.: 18/480,572

(22) Filed: Oct. 4, 2023

(65) Prior Publication Data

US 2024/0110673 A1 Apr. 4, 2024

(30) Foreign Application Priority Data

Oct. 4, 2022 (EP) .................................... 22306475

(51) Int. Cl.
*F17C 13/06* (2006.01)
*F17C 13/04* (2006.01)

(52) U.S. Cl.
CPC .............. *F17C 13/06* (2013.01); *F17C 13/04* (2013.01); *F17C 2205/0314* (2013.01); *F17C 2205/0323* (2013.01)

(58) Field of Classification Search
CPC ......................... F17C 13/06; F17C 2205/0308
See application file for complete search history.

(56) References Cited

U.S. PATENT DOCUMENTS

| | | | | |
|---|---|---|---|---|
| 1,633,197 A * | 6/1927 | Snyder | B65D 35/42 220/291 |
| 2,599,472 A * | 6/1952 | Miller | F16N 21/06 184/105.3 |

(Continued)

FOREIGN PATENT DOCUMENTS

| | | | |
|---|---|---|---|
| DE | 19929699 A1 | 11/2000 |
| DE | 202021104514 U1 | 9/2021 |
| FR | 3056281 A1 | 3/2018 |

OTHER PUBLICATIONS

European Search Report in EP Patent Application No. 22306475.9 dated Mar. 24, 2023.

*Primary Examiner* — Reinaldo Sanchez-Medina
*Assistant Examiner* — Nicole Gardner
(74) *Attorney, Agent, or Firm* — Dilworth IP, LLC

(57) ABSTRACT

A device for supplying pressurised fluid, including a vessel, a pressure reducing valve including a first end connected to the vessel and a second free end configured to be connected to a connector, a protective cover including a cap extending around the free end of the pressure reducing valve, an annular portion extending around a body of a pressure reducing valve and a strut connecting the cap to the annular portion, a shrink foil extending at least around part of the cap and the connecting strut so as to press the cap and the connecting strut against the pressure reducing valve.

18 Claims, 3 Drawing Sheets

(56) References Cited

U.S. PATENT DOCUMENTS

| | | | | |
|---|---|---|---|---|
| 3,827,591 | A * | 8/1974 | Spelman | B65D 41/62 53/442 |
| 5,456,294 | A | 10/1995 | Tsao et al. | |
| 2005/0023238 | A1 * | 2/2005 | Wong | B65D 55/16 220/291 |
| 2008/0078769 | A1 * | 4/2008 | Crunkleton | B67D 1/0057 220/560.04 |
| 2015/0232235 | A1 | 8/2015 | Lloyd | |
| 2020/0180829 | A1 | 6/2020 | Howell | |
| 2020/0378559 | A1 * | 12/2020 | Dahl | F16K 1/305 |

* cited by examiner

DEVICE FOR PROTECTING A DEVICE FOR SUPPLYING PRESSURISED FLUID

FIELD OF THE INVENTION

The invention relates to devices for supplying pressurised fluid and more particularly a device for protecting a valve, for example a pressure reducing valve, of such supply devices.

BACKGROUND OF THE INVENTION

A device for supplying pressurised fluid comprises a bottle forming a vessel of pressurised fluid. This fluid may be for example carbon dioxide (for alimentary use), a mixture of argon, nitrogen and carbon dioxide, etc. This fluid vessel comprises a fluid outlet port blocked by a pressure reducing valve (or cock), the pressure reducing valve being used to keep the fluid inside the bottle and forming at the same time a port to access an inner volume of the bottle containing the pressurised fluid.

A fluid connector may be connected to the pressure reducing valve to allow controlled release of the fluid from the device for supplying pressurised fluid. The pressure inside the bottle is of the order of 250 bars. The pressure reducing valve acts as a first expansion device, causing the fluid pressure, at the outlet of the pressure reducing valve, to drop to between 30 and 70 bars. The connector connected to the pressure reducing valve acts as a second expansion device, causing the pressure to drop to between 4 and 7 bars, and as a device for releasing pressurised fluid.

The devices for supplying pressurised fluid are manufactured (bottle and pressure reducing valve), filled (or refilled) then transported and stored before use via a connection to the above-mentioned connector. Transport and storage are therefore carried out with a pressure reducing valve having a free end. To protect the free end of the pressure reducing valve against any contamination, it is known to use a protective cover on this end. An example of a protective cover is for example described in application FR 3 056 281 A1. This protective cover may comprise a cap intended to be positioned on the free end of the pressure reducing valve, an annular portion surrounding the body of the pressure reducing valve and used to keep the protective cover on the pressure reducing valve, and a strut connecting the annular portion to the cap.

However, such a protection, although efficient against external contamination may, depending on the storage and transport conditions, lead to self-contamination. The protective cover, and more precisely the cap may, in fact, be caused to rotate around the free end of the pressure reducing valve. This exerts friction between the cap and the free end of the pressure reducing valve. Since the protective cover is generally made of plastic material, this exerts friction between the plastic material (the cap) and a metallic material (the pressure reducing valve), which may lead to the formation of plastic particles contaminating the free end of the pressure reducing valve and therefore the fluids extracted from the device for supplying pressurised fluid.

SUMMARY OF THE INVENTION

The invention aims in particular to provide a device for supplying pressurised fluid of the above-mentioned types and providing optimum protection of the free end of the pressure reducing valve.

The invention therefore relates to a device for supplying pressurised fluid, comprising:

- a vessel,
- a valve comprising a first end connected to the vessel and a second free end configured to be connected to a connector,
- a protective cover comprising a cap extending around the free end of the valve, an annular portion extending around a body of the valve and a strut connecting the cap to the annular portion,
- a shrink foil extending at least part of around the cap and the connecting strut so as to press the cap and the connecting strut against the valve.

Thus, the protective cover is pressed against the valve using a shrink foil. Thus, and during the storage and transport of the device for supplying fluid before the first use, the shrink foil prevents the protective cover, and more particularly the cap, from rotating, thereby preventing any self-contamination as explained above. This neutralisation is provided by compressing the cap as well as the connecting strut against the valve. In addition, due to its presence, the shrink foil forms a seal guaranteeing that the device for supplying pressurised fluid has not been used.

According to other optional characteristics of the device for supplying pressurised fluid taken alone or in combination:

- The cap comprises a cylindrical wall and a bottom wall delimiting a volume protecting the free end and a gripping collar for gripping the cap. The cap is therefore easy to handle, for example to remove it from the free end of the valve;
- The cap comprises an annular bead configured to fit in a first annular groove arranged on the body of the valve. This stabilises the attachment of the cap on the free end of the valve;
- The protective cover is made of rubber, preferably ethylene propylene diene monomer rubber. The use of rubber allows elastic deformation when assembling the protective cover on the valve and when handling the protective cover after installation;
- The annular portion extends around a second annular groove of the body of the valve. This allows the annular portion to be positioned easily on the valve;
- The second annular groove comprises at least one adjustment ring of the position of the annular portion. This allows the annular portion to be correctly positioned in the second annular groove, while continuing to use standard valves;
- The length of the connecting strut is between 1.2 and 2 times the distance between the free end of the valve and the second annular groove, preferably substantially equal to 1.5 times the distance between the free end of the valve and the second annular groove;
- The shrink foil is a dry-shrink foil, preferably comprising viscose;
- The shrink foil is a heat-shrink foil, preferably comprising a material selected from polyvinyl chloride, polyethylene terephthalate and polylactic acid;
- The shrink foil extends around the cap, the connecting strut and the annular portion. This blocks the protective cover against the valve more securely;
- The shrink foil extends around the cylindrical wall and covers at least partially the bottom wall of the cap; and
- The valve is a pressure reducing valve.

BRIEF DESCRIPTION OF THE FIGURES

The invention will be better understood on reading the following description, given solely by way of example and with reference to the accompanying drawings in which.

DETAILED DESCRIPTION

Figure 1:
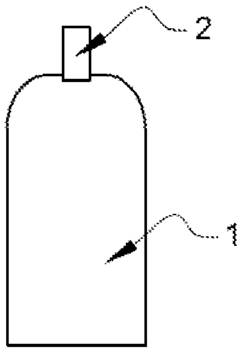
FIG. 1 is a schematic view of a bottle forming a vessel of pressurised fluid connected to a pressure reducing valve.
Figure 2:
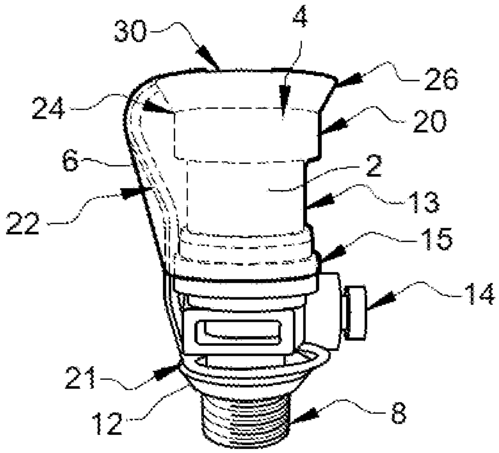
FIG. 2 is a perspective view of an assembly formed by a first variant of a pressure reducing valve, a protective cover and a shrink foil.
Figure 3:
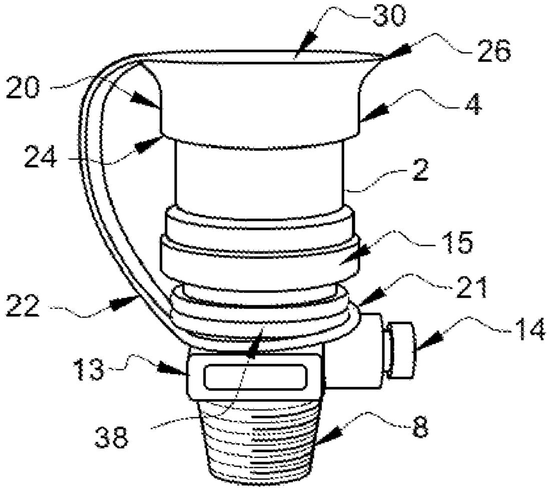
FIG. 3 is a perspective view of an assembly formed by a second variant of a pressure reducing valve and a protective cover.
Figure 4:
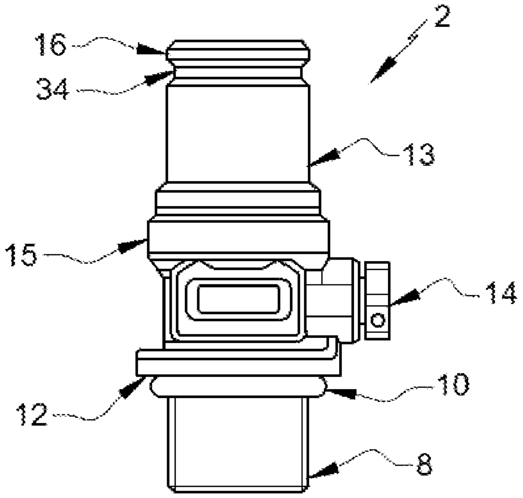
FIG. 4 is a side view of a first variant of a pressure reducing valve.
Figure 5:
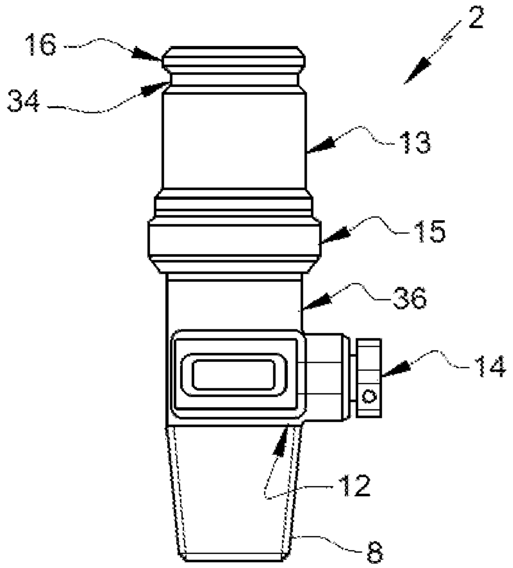
FIG. 5 is a side view of a second variant of a pressure reducing valve.

We now refer to FIG. 2 showing an assembly formed by a first variant of a pressure reducing valve 2 (for example cylindrical), a protective cover 4 and a shrink foil 6. This assembly is arranged on a bottle forming a vessel 1 of pressurised fluid (see FIG. 1). FIGS. 2 and 4 show a pressure reducing valve according to a first variant, whereas FIGS. 3 and 5 show a pressure reducing valve according to a second variant. The invention can be implemented regardless of the pressure reducing valve used.

The valve could be of a different type than a pressure reducing valve 2. The description will describe embodiments including a pressure reducing valve 2.

As explained above, the pressure reducing valve 2 acts as a first pressurised fluid expansion member. It comprises a first end 8 configured to be connected to the vessel 1 of pressurised fluid. It may be for example a threaded end in order to screw the pressure reducing valve 2 onto the vessel 1 (which in this case comprises a tapped port for receiving the pressure reducing valve 2). An O-ring 10 shown on FIG. 4, can be arranged against a shoulder 12 (see FIG. 4) delimiting the first end 8, the O-ring 10 being compressed between the shoulder 12 and the vessel 1 when the pressure reducing valve is installed on the vessel 1 to seal the interface between these two elements.

A body 13 of the pressure reducing valve 2 may also comprise an overpressure protection device 14, formed by a rupture disc (the rupture pressure being for example equal to 190 bars) and a rupture disc support, installed in a port of the body 13 of the pressure reducing valve 2 out of which comes a channel communicating with an internal chamber through which the pressurised fluid flows.

The pressure reducing valve 2 further comprises a free end 16 configured to be connected to a fluid connector (not shown) to allow a second expansion of the pressurised fluid and to extract it from the vessel 1.

The free end 16 is also preferably configured to be connected to a fluid connector (not shown) to allow the filling of the vessel 1 via the valve 2.

The pressure reducing valve 2 can be made of two parts, the free end 16 being present on a first part of the body 13 of the pressure reducing valve 2, connected to a second part of the body 13 of the pressure reducing valve 2. This first part may comprise for example a thread cooperating with a tapping made in a cavity of the second part of the body 13 of the pressure reducing valve 2, it being also possible to provide an O-ring at the interface between the bottom of the cavity and the threaded end which, when compressed, seals the area.

Concerning the operation of the pressure reducing valve 2, its internal architecture in particular is known by those skilled in the art, for example in document US 2014/0312042 A1, and will not be described in detail in this application.

Figure 6:
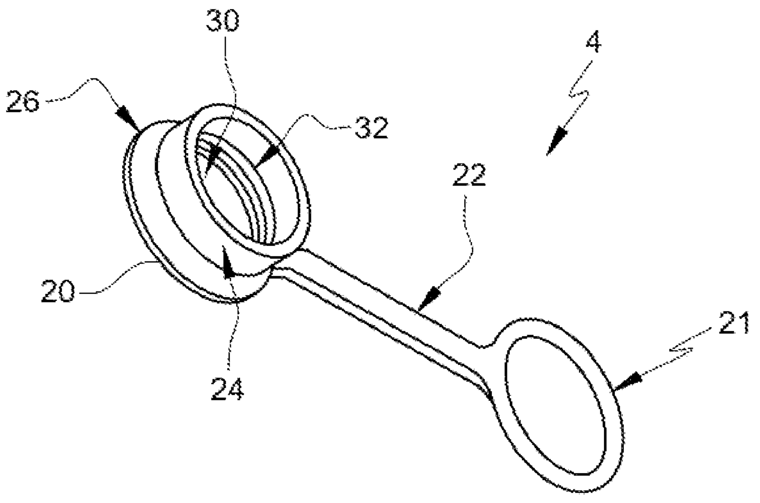
FIG. 6 is a perspective view of a protective cover according to the invention.

The device for supplying pressurised fluid further comprises a protective cover 4, installed on the pressure reducing valve on FIGS. 2 and 3 and shown alone on FIG. 6, comprising a cap 20 extending around the second free end 16 of the pressure reducing valve 2, an annular portion 21 extending around a body 13 of a pressure reducing valve 2 and a strut 22 connecting the cap 20 to the annular portion 21.

The cap 20 may comprise a cylindrical wall 24 (for example tubular), and a bottom wall 30 pressed against the free end 16, delimiting a volume protecting the free end 16, and a gripping collar 26 for gripping the cap 20. "A volume" means a free space sized to accommodate the free end 16, this free space being delimited by a lateral wall (the cylindrical wall 24) and the bottom wall 30. The cap 20 is therefore easy to handle, for example to remove it from the free end 16 of the pressure reducing valve 2. The gripping collar 26 may extend from the bottom wall 30, radially relative to the direction in which the cylindrical wall 24 extends.

The cap 20 may comprise an annular bead 32 intended to fit in a first annular groove 34 arranged on the body 13 of the pressure reducing valve 2. This stabilises the attachment of the cap 20 on the free end 16 of the pressure reducing valve 2. This annular bead 32 therefore extends in the protective volume (from the cylindrical wall 24), preferably being integrally moulded with the cap 20.

Advantageously, the protective cover 4 is made of rubber, preferably ethylene propylene diene monomer rubber (EPDM). A Shore A hardness index of 80+/−5 of the material forming the protective cover 4 is, for example, acceptable. Any other material, in particular a material allowing elastic deformation, can be used. The use of rubber allows elastic deformation when installing the protective cover 4 on the pressure reducing valve 2 and when handling the protective cover 4 after installation. This allows in fact elastic deformation of the annular portion 21 when positioning it on the pressure reducing valve 2, as will be described below. This elastic deformation may also allow tight fitting of the cap 20 on the free end 16. Lastly, and due to the reusable nature of the cap 20, when handling the cap 20, in particular when removing it from the free end 16, the connecting strut 22 should preferably be elastic. The protective cover 4 is preferably made in one piece, for example by injection moulding.

The annular portion 21 may extend around a second annular groove 36 of the body 13 of the pressure reducing valve 2. This allows the annular portion 21 to be positioned easily on the pressure reducing valve 2. This second annular groove 36 can be made by machining the body 13 of the pressure reducing valve 2. As an alternative, it may be formed through the presence, as shown for example on FIGS. 3 and 5, of portions of larger height (for example of a protrusion 15 and of the overpressure protection device 14) each side of the second annular groove 36 without having to machine the body 13 of the pressure reducing valve 2. This annular portion 21 can be used to connect the protective cover 4 to the pressure reducing valve 2 so that the protective cover 4 can be reused.

The second annular groove 36 may comprise at least one adjustment ring 38 (see FIG. 3) for adjusting the position of the annular portion 21. This is particularly interesting when using a second annular groove 36 formed without machining and therefore whose dimensions may not correspond to those of the annular portion 21. This allows the annular portion 21 to be correctly positioned in the second annular groove 36, while continuing to use standard pressure reducing valves 2. In other words, and so that the annular portion 21 is correctly positioned in the second annular groove 36, an adjustment ring 38 constrains the positioning of the annular portion 21.

The length of the connecting strut 22 may be between 1.2 and 2 times the distance between the free end 16 of the pressure reducing valve 2 and the second annular groove 36, preferably substantially equal to 1.5 times the distance between the free end 16 of the pressure reducing valve 2 and the second annular groove 36. A connecting strut 22 of length close to the distance between the free end 16 of the pressure reducing valve 2 and the second annular groove 36, while remaining greater than this distance, will limit the movements of the protective cover 4 on the pressure reducing valve 2 while allowing the protective cover to be handled. The length of the connecting strut 22 can be chosen in particular according to the ability of the material forming it to deform.

The device for supplying pressurised fluid also comprises a shrink foil 6 extending at least around the cap 20 and the connecting strut 22 so as to press the cap 20 and the connecting strut 22 against the pressure reducing valve 2. Due to the above-mentioned pressing, the shrink foil 6 blocks the protective cover 4 against the pressure reducing valve 2. As explained above, this avoids self-contamination. In this case, the shrink foil 6 is cylindrical so that it can be positioned easily around the cap 20 and the connecting strut 22 before shrinking.

As shown on the figures, the annular portion 21 can be positioned above (FIG. 3) or below (FIG. 2) the overpressure protection device 14 depending on the variant of the pressure reducing valve 2 used (which determines the position of the second annular groove 36). The latter may also be covered by the shrink foil 6. This helps to block the protective cover 4 against the pressure reducing valve 2. This covering can be carried out even if this amounts to covering the overpressure protection device 14.

Preferably, and in a way that can be combined with the coverings described above, the shrink foil 6 extends around the cylindrical body 24 and covers at least partially the bottom wall 30 of the cap 20. Once again, this helps to block the protective cover 4 against the pressure reducing valve 2.

The shrink valve 6 may be a dry-shrink foil, preferably made of viscose, or a heat-shrink foil, preferably made of polyvinyl chloride, polyethylene terephthalate or polylactic acid. Drying or heating causes the shrink foil 6 to shrink and therefore leads to the above-mentioned pressing.

Its diameter may be for example 10% to 15% greater than that of the protective cover 4 so that it is easier to position before shrinking. Its length may cover the cap 20, and at least the connecting strut 22 by extending around the free end 16, and at least partially the protrusion 15. As explained above, the length of the shrink foil 6 may vary depending on the covering possibilities listed above.

The steps of the method for positioning the assembly formed by the protective cover 4 and the shrink foil 6 on the pressure reducing valve 2 are as follows:

i. Installing the protective cover 4 on the pressure reducing valve 2. The annular portion 21 can be positioned in the second annular groove 36 if provided, and the cap 20 installed on the free end 16.

Depending on the area of the body 13 of the pressure reducing valve 2 on which the annular portion 21 is positioned and its ability to elastically deform, passing the annular portion 21 via the free end 16 may be considered. Thus, the protective cover 4 can be installed after assembling the pressure reducing valve 2 on the vessel 1. If installation via the free end 16 is not possible, installation must be carried out via the first end 8 of the pressure reducing valve 2 before assembling the pressure reducing valve 2 on the vessel 1.

ii. Arranging the shrink foil 6 around the assembly formed by the pressure reducing valve 2 and the protective cover 4, so as to cover at least the cap 20 and the connecting strut 22. At this stage, the diameter of the shrink foil 6 is greater than that of the assembly formed by the pressure reducing valve 2 and the protective cover 4. The vessel 1 is filed before arranging the shrink foil 6 around the assembly formed by the pressure reducing valve 2 and the protective cover 4.

iii. Shrinking the shrink foil 6, for example by drying or heating, to press at least the cap 20 and the connecting strut 22 against the pressure reducing valve 2.

The shrink foil 6 preferably comprises an area of mechanical weakness, for example an area comprising several perforations so that it is easier to remove when using the device for supplying pressurised fluid for the first time. As explained above (and illustrated on FIG. 2), the shrink foil 6 can extend over the bottom wall 30. Thus, it can delimit a circular opening for the shrink foil 6 at the bottom wall 30 surface. Indeed, and thanks to this configuration, a user can easily grab an end of the shrink foil 6 in the area of mechanical weakness, at the bottom wall 30 surface, to pull it in order to remove the shrink foil 6 from the protective cover 4.

LIST OF REFERENCES

1: vessel
2: pressure reducing valve
4: protective cover
6: shrink foil
8: first end
10: O-ring
12: shoulder
13: body of the pressure reducing valve
14: overpressure protection device
15: protrusion
16: free end
20: cap
21: annular portion
22: connecting strut
24: cylindrical wall
26: gripping collar
30: bottom wall
32: annular bead
34: first annular groove
36: second annular groove
38: adjustment ring(s)

The invention claimed is:

1. A device for supplying pressurised fluid, comprising:

a vessel, a valve comprising a first end connected to the vessel and a second end configured to be connected to a connector, a protective cover comprising a cap extending around the second end of the valve, an annular portion extending around a body of the valve, and a strut connecting the cap to the annular portion, and a shrink foil extending at least around part of the cap and the connecting strut so as to press the cap and the connecting strut against the valve, wherein the cap comprises a cylindrical wall and a bottom wall delimiting a volume protecting the second end, and a gripping collar for gripping the cap, wherein the gripping collar extends around a distal end of the cap, the gripping collar having an outer diameter greater than an outer diameter of the cylindrical wall, and wherein the shrink foil extends over and covers the cylindrical wall and at least partially covers the gripping collar and the connecting strut.

2. The device for supplying pressurised fluid according to claim 1, wherein the cap comprises an annular bead configured to fit in a first annular groove arranged on the body of the valve.

3. The device for supplying pressurised fluid according to claim 1, wherein the protective cover is made of rubber.

4. The device for supplying pressurised fluid according to claim 3, wherein the rubber is ethylene propylene diene monomer rubber.

5. The device for supplying pressurised fluid according to claim 1, wherein the annular portion extends around a annular groove of the body of the valve.

6. The device for supplying pressurised fluid according to claim 2, further comprising at least one adjustment ring, separate from the cap and the annular portion, extending around the annular groove of the body of the valve, the at least one adjustment ring adjusting a position of the annular portion.

7. The device for supplying pressurised fluid according to claim 5, wherein a length of the connecting strut is between 1.2 and 2 times a distance between the second end of the valve and the annular groove.

8. The device for supplying pressurised fluid according to claim 7, wherein the length is equal to 1.5 times the distance.

9. The device for supplying pressurised fluid according to claim 1, wherein the shrink foil is a dry-shrink foil.

10. The device for supplying pressurised fluid according to claim 9, wherein the dry-shrink foil comprises viscose.

11. The device for supplying pressurised fluid according to claim 1, wherein the shrink foil is a heat-shrink foil.

12. The device for supplying pressurised fluid according to claim 11, wherein the heat-shrink foil comprises a material selected from polyvinyl chloride, polyethylene terephthalate and polylactic acid.

13. The device for supplying pressurised fluid according to claim 1, wherein the shrink foil extends around the cap, the connecting strut and the annular portion.

14. The device for supplying pressurised fluid according to claim 1, wherein the shrink foil extends around the cylindrical wall and covers at least partially the bottom wall of the cap.

15. The device for supplying pressurised fluid according to claim 1, wherein the valve is a pressure reducing valve.

16. A device for supplying pressurised fluid, comprising:

a vessel, a valve comprising a first end connected to the vessel and a second end configured to be connected to a connector, a protective cover comprising a cap extending around the second end of the valve, an annular portion extending around an annular groove of a body of the valve, and a strut connecting the cap to the annular portion, a shrink foil extending at least around part of the cap and the connecting strut so as to press the cap and the connecting strut against the valve, and at least one adjustment ring, separate from the cap and the annular portion, extending around the annular groove of the body of the valve, the at least one adjustment ring adjusting a position of the annular portion.

17. The device for supplying pressurised fluid according to claim 16, wherein a length of the connecting strut is between 1.2 and 2 times a distance between the second end of the valve and the annular groove.

18. The device for supplying pressurised fluid according to claim 17, wherein the length is equal to 1.5 times the distance.

* * * * *